July 29, 1969  YUTAKA IKEDA ET AL  3,457,615

METHOD OF MAKING GLASS CAPACITORS

Original Filed March 25, 1964  2 Sheets-Sheet 1

INVENTORS
YUTAKA IKEDA
MASAHIRO HOSHINO
HAYASHI KUROKI
BY

Kurt Kelman
Agent

United States Patent Office 3,457,615
Patented July 29, 1969

3,457,615
METHOD OF MAKING GLASS CAPACITORS
Yutaka Ikeda, Otsu, Shiga, Masahiro Hoshino, Otsu-shi, Shiga, and Hayashi Kuroki, Kyoto, Japan, assignors to New Nippon Electric Company Limited, Shiga, Japan, a corporation of Japan
Continuation of application Ser. No. 354,716, Mar. 25, 1964, which is a continuation-in-part of application Ser. No. 334,698, Dec. 31, 1963. This application May 17, 1966, Ser. No. 558,175
Int. Cl. H01g 13/00
U.S. Cl. 29—25.42                       2 Claims

ABSTRACT OF THE DISCLOSURE

A glass capacitor is made by integrally bonding a continuous layer of glass to a self-supporting metallic electrode and covering the exposed glass layer face with a counter-electrode.

---

This application is a continuation of our copending application Ser. No. 354,716, filed Mar. 25, 1964, now Patent No. 3,277,354, which is a continuation-in-part of our application Ser. No. 334,698, filed Dec. 31, 1963, now abandoned.

This invention relates to a method of making capacitors in which glass is employed as a dielectric medium.

Glass capacitors are preferred where severe environmental conditions would affect capacitors employing paper, air, mica, or ceramic materials as dielectric media. Glass not only resists high operating temperatures and high humidity without loss of dielectric properties but is also unaffected by ionizing radiation, by strong electric or magnetic fields, and by electric potentials varying at extremely high frequency.

Glass capacitors have been disclosed, for example, in U.S. Patent No. 2,526,703 to Gail P. Smith, and conventionally consist of a thin rectangular strip of glass whose opposite faces are covered with metal foil, the entire laminated structure being enclosed in a protective covering. Capacitors of this type require glass plates to be made to a controlled thickness of the order of 40 microns. This is very difficult and the conventional glass capacitors are not readily made to close tolerances.

The primary object of this invention is a method for the ready manufacture of a glass capacitor to closely reproducible characteristics.

The invention resides in a method for making a capacitor in which one face of a self-supporting metallic base plate is coated with finely divided glass particles, and the glass particles are fused until they form a continuous layer of glass superimposed on the aforementioned face of the base plate and integrally bonded thereto. The exposed face of the glass layer is then covered with a layer of conductive material.

Other features and many of the attendant advantages of this invention will be readily appreciated as the same becomes better understood by reference to the following detailed description when considered in connection with the accompanying drawing in which.

Figure 1:
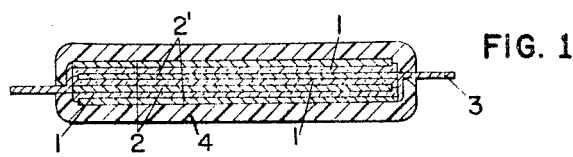
FIG. 1 shows a conventional glass capacitor in elevational section.

Referring now to the drawing in detail, and initially to FIG. 1, there is seen a conventional glass capacitor. It has a laminated structure and includes glass strips 1 inter leaved with metal foils 2, 2′ which constitute the electrodes of the capacitor. The laminated structure is encased in an outer protective coating 4. Lead-in wires 3 conductively attached to the electrodes 2, 2′ pass through the coating.

Figure 2:
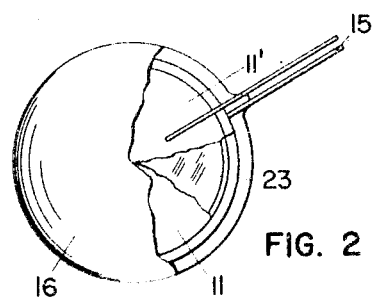
FIG. 2 shows a capacitor of the invention in plain view, portions of the structure being broken away to reveal internal elements.

The capacitor of the invention illustrated in FIG. 2 consists mainly of two relatively heavy, shape-retaining and self-supporting metal plates 11, 11′ and a glass layer 23 sandwiched between the metal plates. The glass layer conforms to the top face and partly to the edge of the base plate 11, the edge being partly enveloped by the glass layer. The glass layer 23 is integrally bonded to the plates 11, 11′, as will be described in more detail hereinbelow.

The plates or electrodes 11, 11′ are provided with lead-in conductors 15 in a conventional manner. The conductors are soldered or welded to the plates in a manner not shown in detail. The assembly of plates 11, 11′ and glass layer 23 is enclosed in a protective outer casing 16 of insulating material in the usual manner.

Figure 3:
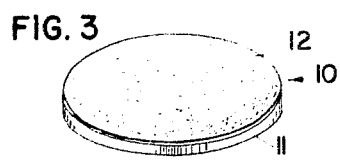
FIG. 3 illustrates as element of a capacitor of the invention as it appears at an initial manufacturing stage, the view being in perspective.
Figure 4:
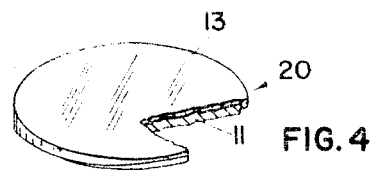
FIG. 4 illustrates the element of FIG. 3 at a later manufacturing stage in a corresponding view, but a section of the element is broken away for a better view of a detail structure.

Intermediate stages in the preparation of the capacitor of FIG. 2 are illustrated in FIGS. 3 and 4. The capacitor element 10 shown in FIG. 3 consists of the base plate 11 and of a layer 12 of finely divided glass particles in a suitable binder and carrier, which are deposited on the top face of the base plate. Upon heating of the element shown in FIG. 3, the binder is volatilized and the glass particles are fused to form a continuous glass layer which is integrally bonded to the metal plate. The heat-treated capacitor element 20 thus is seen in FIG. 4 to consist of the base plate 11 and of a continuous glass layer 13 fused to the top face of the plate 11.

The intermediate structure illustrated in FIG. 4 is made into a complete capacitor by the provision of a counter-electrode, of leads, and of an outer protective coating. Examples of capacitors of the invention are shown in FIGS. 5 to 7.

Figure 5:
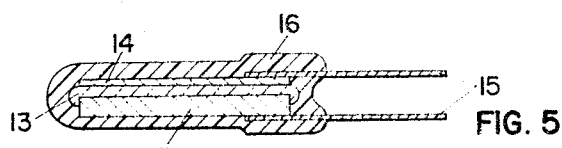
FIG. 5 shows a completed capacitor of the invention in elevational section.

In the embodiment of the invention illustrated in FIG. 5, the glass layer 13 is seen to overhang and partly to envelop the edge of the base plate 11 to which it is integrally bonded. A metal layer 14 covers the originally exposed face of the glass layer 13 in a manner conventional in itself, and the laminated structure of base plate 11, glass layer 13 and counterelectrode 14 is encased in an outer protective coating 16 from which the leads 15 project.

Figure 6:
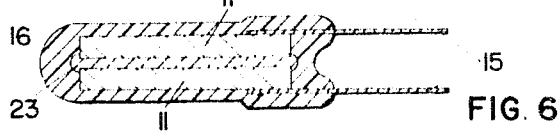
FIG. 6 is a similar view of the capacitor of FIG. 2.

FIG. 6 is an elevational sectional view of the capacitor of FIG. 2. The capacitor mainly consists of two relatively heavy plate members 11, 11' which are bonded to opposite faces of a glass layer 23. The capacitor shown in FIG. 6 is assembled from two intermediate elements of the type shown in FIG. 4 which are superimposed with their glass layers 13 touching each other. When the composite structure is heated to the melting range of the glass layers, the two glass layers 13 are integrally bonded into a unitary layer 23. The assembly is then provided with leads 15 and an external coating 16 in the usual manner.

Figure 7:
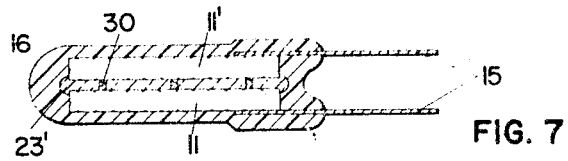
FIG. 7 illustrates a modification of the capacitor of FIG. 6.

A modification of the capacitor illustrated in FIG. 6 is shown in FIG. 7. Its glass layer 23' contains spacer particles 30 of a material having the necessary electrical properties and a substantially higher melting point than the glass particles of the layers 13. The spacer particles are substantially insoluble in the fused glass during the short periods of fusion required for assembly of the capacitor, and are carefully classified to a narrow range of grain sizes. The spacer particles are incorporated in one or both layers 12 of glass particles which ultimately are fused into the dielectric layer 23'. When two capacitor elements corresponding to that shown in FIG. 4, but containing spacer particles 30, are superimposed and their glass layers are fused, sufficient pressure is applied to the two plates 11, 11' to bring them into simultaneous contact with the spacer particles, whereby the thickness of the dielectric layer may be precisely controlled.

The layer 12 of glass particles is preferably deposited on the top face of the plates 11, 11' from a suspension in a liquid carrier. The glass particles are obtained by grinding glass of a suitable composition in a mill to the approximate desired grain size, and screening or otherwise classifying the glass powder so obtained.

The embodiments of the invention illustrated in FIGS. 8 to 13 are representative of a modification of this invention which is of particular utility in capacitors of very small dimensions.

Such small capacitors are difficult to handle in the several manufacturing steps of this invention, and it is difficult to join lead-in wires to a small assembly of electrodes and dielectric. It is not usually practical to attach lead-in wires to the electrodes prior to the fusing of the glass layer by soldering because of the relatively high temperatures involved in fusing the glass, and welding very small and thin metal objects is costly. Moreover, it may result in undesirable variations in the properties of the capacitors produced.

Figure 8:
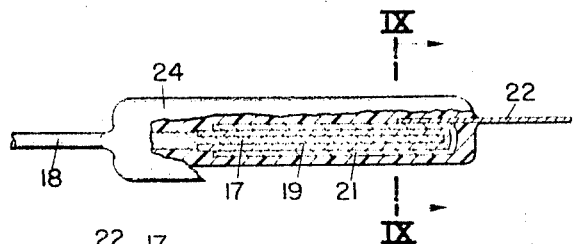
FIG. 8 shows a miniature capacitor of the invention on a greatly enlarged scale, the view being in elevation, and partly in section.
Figure 9:
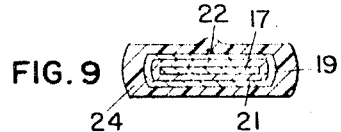
FIG. 9 shows the capacitor of FIG. 8 in section on the line IX—IX.

The embodiment of the invention shown in FIGS. 8 and 9 has a base plate 17 which is integral with its lead-in conductor 18. The integral assembly of lead-in wire and base plate is prepared by flattening a portion of a wire which may be originally round. A press having two flat platens and abutments which limit the movement of the platens toward each other is suitable for shaping a base plate on a wire of originally round or other cross section.

In preparing very small capacitors, we may use "Dumet wire" as a starting material. Dumet wire is made of an alloy mainly consisting of 42% nickel, balance iron, and is copper plated to prevent gassing when the wire is sealed in glass. A cylindrical Dumet wire having an original diameter of 0.5 millimeter may be flattened until its cross section is a rectangle. The thickness may be reduced to 0.1 millimeter or even to 0.05 millimeter and the width of the flattened portion is simultaneously increased to about 2 millimeters or more. A flattened wire section 5 millimeters long is typical of the base plates for small capacitors which are readily obtained from various metals. Ten to twenty square millimeters is a typical size for the base plate 17.

Figure 10:
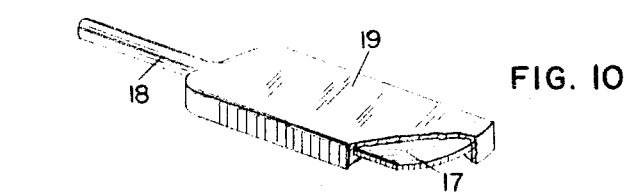
FIG. 10 is a perspective view of a detail of the capacitor of FIGS. 8 and 9.

The base plate may further be electroplated if made from a metal not in itself suitable for sealing to glass. It is then coated with glass particles in a carrier. The carrier is volatilized, and the glass particles are fused to form a glass envelope 19 over the base plate. FIG. 10 shows a glass coated base plate of the invention, a portion of the coating being broken away to show the flat base plate. As is evident from FIG. 8, the thickness of the two layers of glass on the opposite faces of the plate 17 is similar to that of the metal layer between them, or about 100 microns.

The sub-assembly illustrated in FIG. 10 is next provided with a second electrode 21 which covers all surfaces of the sub-assembly except the one from which the lead-in wire 18 projects outward. The illustrated electrode 21 consists of metal deposited by dipping in silver paste. It is provided with a lead-in wire 22 which is attached to the paste while it is still wet. The two electrodes 17, 21 together with the dielectric glass envelope 19 and portions of the lead-in wires 18 and 22 are then covered with a protective outer coating 24.

Throughout the several manufacturing steps outlined above, the several intermediate products and the finished capacitor may be safely and conveniently handled by the lead-in wire 18.

Figure 11:
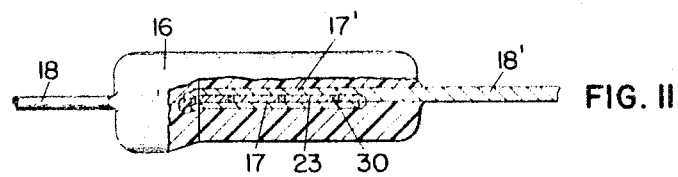
FIG. 11 illustrates a modification of the capacitor of FIG. 8 in a corresponding view.
Figure 12:
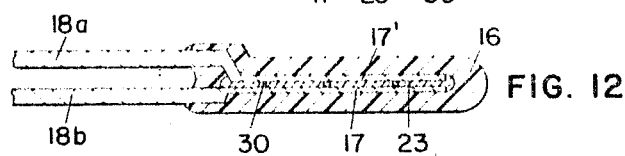
FIG. 12 shows yet another minature capacitor of the invention in elevational section.
Figure 13:
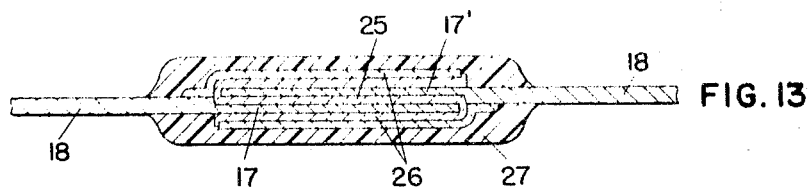
FIG. 13 shows as additional embodiment of the invention.

The embodiments of the invention shown in FIGS. 11, 12, and 13 employ two electrodes 17, 17' which are the flattened integral end portions of lead-in wires 18, 18'. The electrodes 17, 17' shown in FIG. 11 are separated by a glass layer 23 in which spacer particles 30 are distributed. The two electrodes 17, 17' are superimposed in such a manner that their lead-in wires 18, 18' project in opposite directions from the outer casing 16 of the capacitor. The manner in which the capacitor shown in FIG. 11 is made will be evident from joint consideration of the manufacturing steps employed in making the embodiments of the invention shown in FIGS. 7 and 8.

In the capacitor illustrated in FIG. 12, two electrodes 17, 17' substantially identical shown in FIG. 11 are separated from each other by a glass layer 23 in which spacer particles 30 are distributed. Their respective integral lead-in wires 18a, 18b project from the same end of the capacitor. In order to avoid a short circuit, the wire 18a is offset adjacent the flattened electrode 17'.

The capacitor shown in FIG. 13 is made by superimposing two sub-assemblies of the type shown in FIG. 10 with their lead-in wires projecting in opposite directions, and then heating the laminar structure until the individual glass envelopes are fused to each other between the two base plates or electrodes 17, 17' into a unitary glass body 25. To increase the capacitance of the device two layers 26 of silver paste are brush painted on the two flat outer glass surfaces, and extend to the respective lead-in wires 18. The assembly is enclosed in a protective outer casing 27.

The choice of materials and processing conditions in manufacturing the capacitors of the invention will be influenced by the following considerations.

Glass compositions which combine desirable electric properties with the ability of bonding to the metal of the plates 11, 11', 17, 17' upon fusion are listed in Table 1 together with their dielectric constants E and quality factors Q. These glasses also are characterized by a relatively low viscosity at temperatures only slightly above their melting points. The property of the glasses listed in Table 1 facilitates the formation of thin glass layers which are essential to high capacitance in a small volume.

Conventional soda lime glasses are less advantageous for the purposes of this invention. While their dielectric constant is relatively high, 5.4 to 9.9, their dielectric loss is of the order of 0.3% and, therefore, too high for many applications. Quartz glass combines a high dielectric constant of 4.5 to 5.5 with a dielectric loss of only about 0.02%, but its melting point is too high for advantageous use in the capacitors of the inventor. However, both soda lime glasses and quartz glasses may be employed in these capacitors when the inherent shortcomings of these materials are acceptable.

The glasses of the invention are prepared by conventionally fusing the ingredients in a crucible at a temperature between 1100° C. and 1360° C. for a time sufficient to produce a homogeneous melt, say two hours. Samples of the molten glasses were molded to form discs having a thickness of 0.1 millimeter. The discs were polished on both sides, coated with conductive silver paste, and the capacitors so formed were employed for measuring the dielectric constants E and the quality factors Q listed in the table.

TABLE I—GLASS COMPOSITIONS, MOLE PERCENT

| | I | II | III | IV | V | VI | VII | VIII | IX | X | XI |
|---|---|---|---|---|---|---|---|---|---|---|---|
| $SiO_2$ | 57.70 | 57.70 | 57.70 | 57.70 | 57.70 | 57.70 | 57.70 | 54.5 | 456.9 | 30.0 | 66.6 |
| $TiO_2$ | 8.90 | 8.90 | 8.90 | 8.90 | 8.90 | 8.90 | 8.90 | 9.5 | 9.1 | 15.00 | 7.6 |
| PbO | 9.60 | 9.60 | 9.60 | 9.60 | 9.60 | 9.60 | 9.60 | 10.4 | 10.2 | 15.00 | 8.6 |
| $K_2O$ | 5.95 | 0 | 0 | 0 | 0 | 0 | 0 | 0 | 0 | 10.00 | 4.3 |
| CaO | 5.95 | 11.90 | 5.95 | 5.95 | 17.85 | 5.95 | 0 | 6.4 | 5.7 | 10.00 | 4.3 |
| BaO | 5.95 | 5.95 | 5.95 | 11.90 | 5.95 | 0 | 17.85 | 5.95 | 5.7 | 10.00 | 4.3 |
| SrO | 5.95 | 5.95 | 11.90 | 5.95 | 0 | 17.85 | 5.95 | 12.8 | 12.4 | 10.00 | 4.3 |
| E | 11.75 | 18.4 | 14.8 | 20.0 | 15.0 | 14.10 | 15.8 | 12.5 | 11.0 | 15.0 | 10.0 |
| Q | 1,300 | 500 | 1,700 | 1,300 | 850 | 1,000 | 880 | 810 | 710 | 600 | 500 |

The eleven glass compositions listed in the table are representative of the glasses most useful for the capacitors of this invention. Generally, glasses used to advantage for this invention meet the following composition requirements, all limits being in mole percent:

$SiO_2$ ----------------------------------------- 30–65
$TiO_2$ ----------------------------------------- 9–16
PbO ------------------------------------------- 7–15
$SiO_2$+$TiO_2$+PbO --------------------- at least 60
$K_2O$ ----------------------------------------- 0–9
CaO ------------------------------------------- 0–17
BaO ------------------------------------------- 0–17
SrO -------------------------------------------- 0–18

The melts are crushed and ground after solidification, and the resulting powder is classified to select particles having grain sizes between 5 and 50 microns. It is generally preferred to limit the glass particles to the lower end of this range. Great care must be taken to avoid contamination of the glass powder with foreign matter, such as fragments of mill material and the like.

The selected glass particle fraction is preferably applied from a liquid system. Suspensions in aqueous or organic carriers may be employed. In order to enhance the stability of the suspensions, we prefer carriers of relatively high viscosity. In aqueous systems, the viscosity may be increased by such known thickeners as polyvinyl alcohol, carboxymethyl cellulose, methacrylic resins, or waxes.

An aqueous suspension which has been used successfully consists of 40 percent by weight glass particles having an average grain size of 10 microns, 1 percent carboxymethyl cellulose having an average degree of polymerization of 400, and water.

The metal plates are preferably coated with the glass suspension by conventional spraying techniques using an air-operated spray gun. Other coating techniques which may be employed include electrophoretic deposition or the settling of a glass particle suspension on metal plates immersed in the suspension.

The metal plates to be coated by glass particles must be stiff enough to maintain their shape during processing according to the method of the invention. Severe deformation of the base plate would crack the glass coating. The metal plate also should be of a chemical composition which favors integral bonding to the glass layer. Another obvious requirement is that the metal have a higher melting point than the glass employed.

While any metal will bond to glasses of the listed compositions to some extent, copper, nickel, chromium and iron are preferred because of their low cost, favorable conductivity and ability to be wetted and adhered to by molten glass. Metals meeting the same requirements, but at higher cost, include platinum and other metals of the platinum group, tantalum, tungsten, molybdenum. These several metals may be combined by alloying, cladding or plating to make best use of their mechanical, chemical and electrical properties.

The coated base plate is subjected to a heat treatment at a temperature above the melting point of the glass particles for a time sufficient to volatilize the binder and residual liquid carrier, and to fuse the layer of molten glass obtained to the surface of the metal plate. Since any residue of binder or carrier would affect the electrical properties of the capacitor, the amount of binder employed in forming the layer or glass particles should be low, and the suspending medium must be capable of complete volatilization by evaporation or combustion with the ambient air. Organic binders in aqueous or organic solvents generally meet this requirement and are preferred. Inorganic non-volatile binders may be employed if their residue does not harmfully affect the properties of the dielectric layer.

During the heat treatment, the metallic base plate is oxidized and the formed oxides partly diffuse into the glass layer. Such diffusion is essential to the integral bonding of glass and metal but it must be controlled by selecting the fusing time and temperature to prevent the dissolved oxide from penetrating too deeply into the glass layer so as significantly to reduce the electrical quality of the same. The importance of this fact will be appreciated when it is considered that the glass layer should have a thickness of approximately 10 to 300 microns only.

Copper and iron oxidize relatively rapidly, and diffusion of their oxides into the glass layer is not readily controlled. We therefore prefer to protect copper and iron plates by nickel or chromium plating prior to coating with the glass suspension. A very thin nickel coating reduces, but does not prevent, the formation and diffusion of copper oxide. The oxides formed on nickel during a reasonable period at the fusion temperatures of the glasses employed are not thick enough to provide a satisfactory bond to a superimposed glass layer.

The following examples are illustrative of the effects of chromium plating on iron base plates prior to coating with glass.

Example 1

Iron discs having a diameter of 1.6 centimeters and a thickness of 0.5 millimeter were electrolytically degreased in a conventional alkaline detergent solution and given an oxide coating by heating to 1000° C. in a hydrogen atmosphere saturated at 20° C. A layer of glass particles 100 microns thick was deposited on one face of each disc from a spray gun charged with the afore-described suspension of 1% carboxymethyl cellulose solution. The coated discs were heated to a temperature of 980° C. for 30 minutes in a tunnel furnace equipped with a conveyor and provided with an atmosphere which was kept neutral or slightly oxidizing during the heat treatment.

Testing of the glass coated iron discs showed that the glass coating was integrally bonded to about 60% of the coated iron surfaces.

Example 2

The discs described in Example 1 were degreased, acid dipped, and chromium plated to a thickness of about 0.3 micron. When a glass layer was applied to the chromium surface in the same manner as described in Example 1, integral bonding of the glass to the metal extended over 90% of the interface.

Example 3

When the procedure of Example 2 was repeated, except for a chromium plate having a thickness of about 1.0 micron, integral bonding between the glass and the metal surface was complete.

We have found that the bond between a chromium surface and a superimposed glass layer can be further strengthened by pre-heating the chromium plated iron discs in an atmosphere of hydrogen and water vapor until a chromium oxide film is formed on the metal surface.

The chromium oxide layer formed in a separate operation or during heat treatment of the glass coated chromium plated discs reduces the oxidation of the underlying iron and the diffusion of the iron oxide into the glass layer which might result in loss of the continuity of the latter. The chromium oxide film also increases the capacitance and raises the breakdown voltage of the capacitor by preventing the formation of bubbles in the glass layer.

The metal layer which constitutes the counterelectrode of the capacitator may be applied to the bonded glass layer in any known manner since the assembly relies for mechanical strength on the stiffness of the base plate which constitutes the other electrode. A paste of silver particles in a thermosetting resin base may be applied to the exposed glass face and cured in a conventional manner. A suitable counterelectrode layer may also be deposited by vacuum evaporation of a metal or by the reduction in situ of a coating of metal oxide powder deposited on the glass surface.

Suitable pastes of resin base having silver particles dispersed therein are commercially available. Commercial products which have been found useful for the purposes of this invention include Du Pont's silver paste No. 4760 and Degussa's silver pastes Nos. 103 and 173–L, which are cured at relatively high temperatures, or Degussa silver paste No. 200 which sets at low temperature.

Capacitors of great mechanical strength, long useful life and closely predictable properties are formed by assembling two glass coated base plates of the invention. When such plates are coated with a glass particle suspension of the composition described hereinabove to a thickness of 100 microns, there is obtained on each plate a continuous glass layer about 30 microns thick after fusion. The shrinkage during heat treatment is due to the elimination of pores between the original glass particles and to the combustion or volatilization of the binder and carrier. Also, a small amount of glass flows over the edge of the base plates and envelops the same, thereby increasing the mechanical strength of the assembly.

After fusion and bonding of the glass layers, the discs are assembled in pairs, one disc of each pair being turned over and superimposed on another coated disc in glass-to-glass engagement. The superimposed pairs of coated discs are then returned to the afore-mentioned tunnel furnace and subjected to heat treatment in the atmosphere thereof which is controlled in the described manner. The two layers of glass are fused and integrally welded to each other.

The thickness of the unitary glass dielectric produced between the two plates depends mainly on the original thickness of glass suspension deposited on the individual discs but also on the viscosity of the fused glass, on the weight of the upper plate and on the duration of heat treatment. The weight of the upper plate tends to squeeze glass laterally from the space between the two electrode plates. This squeezing action may be enhanced by placing a small block of metal or other heat resistant material on the exposed outer face of the upper plate. With a conveyorized and closely controlled tunnel furnace, laminated structures having glass layers of predictable and reproducible thickness can be produced in such a manner.

An even more precise control of glass layer thickness is achieved if the method described in the preceding paragraphs is modified to include spacer particles in the glass layer. With the use of such spacer particles, variations in process variables have little or no influence on the thickness of the glass layer ultimately produced between the two electrodes of the capacitor.

The spacer particles are embedded in the glass layer, and must consist of material which does not unfavorably affect the dielectric properties of the glass. Their melting point must be substantially higher than that of the embedding glass, and they must not dissolve in the molten glass to an appreciable extent during the period in which the glass is in the liquid state. The spacer material also must be capable of being comminuted to the required size, and of being sorted according to size.

Materials which satisfy these requirements include the oxides of aluminum, thorium, berryllium, titanium and zirconium, also the titanates of barium and zirconium. Other materials may be found suitable. The spacer material is crushed, ground, and screened or otherwise classified to a particle size corresponding to the desired thickness of the dielectric layer.

The sized spacer material is admixed to the suspension of glass particles in an amount whose upper limit is determined by the need for maintaining a continuous glass matrix, whereas the lower limit is set by the need for supporting the weight of the upper electrode while the embedding glass is fluid. Approximately ten percent of spacer particles admixed to the glass particle suspension will generally give good results but this figure, while representative of good practice, will be understood not to be critical. The mixed suspension is kept uniform by vigorous stirring prior to application. Uniformity of the suspension is also improved by the choice of spacer particles which have the same ultimate settling velocity in the liquid carrier as the glass particles.

When the applied layer of glass and spacer particles is fused on the base plate in the first heat treatment, there is obtained a glass layer in which spacer particles are embedded. Superimposition of two discs coated with a glass layer and spacer particles, or superimposition of one such disc and of another disc coated with a glass layer, and fusion of the glass layers results in an assembly of two plates fused to a dielectric layer mainly consisting of glass. The plates are spaced from each other a distance equal to the grain size of the spacer particles. The latter control the downward movement of the upper electrode during the second heat treatment.

The assembly of operative capacitor elements produced by any one of the methods described hereinabove, is provided with lead-in conductors by soldering or welding if the base plate is not integral with a lead-in conductor. A protective outer covering of moisture resisting insulating material is ultimately applied, as is conventional. Preferred materials for the outer covering are chemically stable, have a sufficient measure of stiffness to contribute to the mechanical strength of the capacitor, and have a melting point substantially higher than the highest temperature expected to be encountred by the capacitor while in service.

Low melting glasses have been found to meet these requirements best, and the outer glass covering is preferably formulated in such a manner that its coefficient of expansion over the expected range of operating temperatures be similar to that of the glass used as a dielectric. If the thickness of the exterior glass layer is less than about two millimeters, thermal expansion and contraction of the outer glass body is not likely to present a significant problem and close matching of expansion coefficients is unnecessary. Capacitors that are intended to operate in an environment including X-rays are preferably given an outer coating of lead glass which significantly retards deterioration of the dielectric.

The external glass layer may be applied by dipping the electrode and dielectric assembly in molten glass or by spray coating the assembly with a glass powder suspension in the manner described in more detail with reference to the forming of the dielectric glass layer.

Materials other than glass may be employed for the outer protective coating, and such materials as fluorinated polyolefine resins, silicone resins and epoxy resins are preferred for exacting requirements. Conventional potting techniques or the fluidized bed coating method disclosed in U.S. Patent No. 2,844,489 are suitable for the purposes of this invention.

It should be understood of course that the foregoing disclosure relates only to preferred embodiments of this invention, and that it is intended to cover all changes and modifications of the examples of the invention herein chosen for the purpose of the disclosure which do not constitute departures from the spirit and scope of the invention set forth in the appended claims.

What is claimed is:
1. A method of making a capacitor which comprises:
 (a) coating only one face of two self-supporting metallic plate members with finely divided glass particles, said one face being chromium;
 (b) then converting the chromium face of each plate member to chromium oxide;
 (c) fusing said glass particles and integrally bonding them to the chromium oxide faces until they form respective continuous layers of glass superimposed on the faces of the two metallic plate members, each of said glass layers having an exposed face;
 (d) contiguously superimposing the exposed faces of the glass layers; and
 (d) heating the glass layers until the superimposed exposed faces thereof are integrally bonded to each other.
2. A method of making a capacitor which comprises:
 (a) flattening respective longitudinal portions of two pieces of metallic wire until the flattened portion of each wire has two opposite faces, the thickness of the flattened portion between said faces is substantially smaller than the original width of the wire, and the width of each face is substantially greater than said original width, while the flattened wire portion is shape retaining and self supporting and an unchanged portion of the wire longitudinally extends from the flattened portion, one of the faces of each flattened wire portion being chromium;
 (b) coating the chromium faces with finely divided glass particles;
 (c) then converting the chromium faces to chromium oxide;
 (d) fusing the glass particles and integrally bonding them to the chromium oxide faces until they form respective continuous layers of glass superimposed on said faces, each of said glass layers having an exposed face;
 (e) contiguously superimposing said exposed faces; and
 (f) heating said glass layers until said superimposed exposed faces are integrally bonded to each other.

References Cited

UNITED STATES PATENTS

| | | | |
|---|---|---|---|
| 2,446,928 | 8/1948 | Hodgdon | 317—258 XR |
| 2,956,219 | 10/1960 | Cianchi | 317—258 |
| 3,072,493 | 1/1963 | Trap | 106—53 |
| 3,086,150 | 4/1963 | Held | 317—261 XR |
| 2,515,337 | 7/1950 | Clark et al. | 219—105 XR |
| 2,759,252 | 8/1956 | Van Embden. | |

FOREIGN PATENTS 10,099 10/1955 Germany.

JOHN F. CAMPBELL, Primary Examiner

RICHARD B. LAZARUS, Assistant Examiner